United States Patent
Plouchart et al.

(10) Patent No.: US 11,379,125 B1
(45) Date of Patent: Jul. 5, 2022

(54) TRUSTED FIELD PROGRAMMABLE GATE ARRAY

(71) Applicant: International Business Machines Corporation, Armonk, NY (US)

(72) Inventors: Jean-Olivier Plouchart, New York, NY (US); Arvind Kumar, Chappaqua, NY (US); Dirk Pfeiffer, Croton on Hudson, NY (US); Takashi Ando, Eastchester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/218,496

(22) Filed: Mar. 31, 2021

(51) Int. Cl.
*G06F 3/06* (2006.01)
*H04L 9/08* (2006.01)

(52) U.S. Cl.
CPC .......... *G06F 3/0623* (2013.01); *G06F 3/0655* (2013.01); *G06F 3/0673* (2013.01); *H04L 9/088* (2013.01)

(58) Field of Classification Search
None
See application file for complete search history.

(56) References Cited

U.S. PATENT DOCUMENTS

| | | | |
|---|---|---|---|
| 6,512,454 B2 | 1/2003 | Miglioli | |
| 7,971,072 B1 | 6/2011 | Donlin | |
| 8,683,210 B2 * | 3/2014 | Devadas | ............... H04L 9/3278 713/185 |
| 8,741,713 B2 | 6/2014 | Bruley | |
| 8,756,438 B2 | 6/2014 | Devadas | |
| 9,059,188 B1 | 6/2015 | Dimitrakopoulos | |
| 9,184,751 B2 * | 11/2015 | Pfeiffer | ................. H03K 19/003 |
| 9,762,391 B2 * | 9/2017 | Han | .................... H04L 9/0866 |
| 10,404,470 B2 | 9/2019 | Hoppert | |
| 10,482,291 B2 | 11/2019 | Woodall | |
| 10,614,231 B1 | 4/2020 | Dozer | |
| 10,657,293 B1 | 5/2020 | Wei | |
| 2002/0199110 A1 | 12/2002 | Kean | |
| 2012/0185636 A1 | 7/2012 | Leon | |

(Continued)

FOREIGN PATENT DOCUMENTS

| | | |
|---|---|---|
| CN | 103593622 A | 2/2014 |
| CN | 107145804 A | 9/2017 |

(Continued)

OTHER PUBLICATIONS

Demulder, Elke, "Side-Channel Analysis Demo: FPGA Board", Rambus, downloaded from the internet on Oct. 28, 2020, 2 pages, <https://www.rambus.com/side-channel-analysis-demo-fpga-board/>.

(Continued)

*Primary Examiner* — Tracy C Chan
(74) *Attorney, Agent, or Firm* — Gilbert Harmon, Jr.

(57) ABSTRACT

An approach to creating a tamper-resistant field programmable gate array (FPGA) and remotely reprogramming the tamper-resistant FPGA. In one aspect, determining if an encryption key is stored in a physical unclonable function (PUF) of the FPGA. Further, responsive to the encryption key not being stored in a PUF, writing an encryption key in tamper resistant memory associated with a back end of the line (BEOL) of the FPGA. In another aspect, writing a program key and a look-up table (LUT) in the tamper resistant memory.

20 Claims, 6 Drawing Sheets

(56) References Cited

U.S. PATENT DOCUMENTS

2015/0071432 A1    3/2015  Zhu
2020/0174010 A1*   6/2020  Pfeiffer ............ G01N 27/44791

FOREIGN PATENT DOCUMENTS

CN          109039591 A     12/2018
CN          105760786 B      5/2019
CN          110716728 A      1/2020

OTHER PUBLICATIONS

Junjie et al., "Formal analysis of trusted FPGA firmware", 2013 6th International Conference on Intelligent Networks and Intelligent Systems, 2013, 4 pages.
Mell et al., "The NIST Definition of Cloud Computing", Recommendations of the National Institute of Standards and Technology, Special Publication 800-145, Sep. 2011, 7 pages.
Skorobogatov et al., "Breakthrough silicon scanning discovers backdoor in military chip", Cryptographic Hardware and Embedded Systems Workshop (CHES 2012), Sep. 9-12, 2012, Leuven, Belgium, 19 pages, <https://www.researchgate.net/publication/260327656>.
Zhao et al., "FREE: FPGA-Reinforced Execution Enclaves in the Public Cloud", PLATFORMLAB, Stanford MAST, provided by the inventor on Oct. 28, 2020, 28 pages.

* cited by examiner

FIG. 7

TRUSTED FIELD PROGRAMMABLE GATE ARRAY

TECHNICAL FIELD

The present invention relates generally to Field Programmable Gate Arrays (FPGA), and more specifically, to securing the encryption circuits of an FPGA.

BACKGROUND

FPGAs are configured with a bit file that is typically downloaded through a network connection, stored in flash memory or stored on a flash card. Even though the bit file is usually encrypted, the encryption key used to secure the bit file can be discovered by techniques such as side channel attacks or picosecond imaging circuit analysis (PICA) on the FPGA because the encryption key is stored in static random access memory (SRAM) or embedded flash. Once the encryption key is discovered, the bit file can be modified and/or reversed engineered. The result of this breach of security is the equivalent of introducing a rogue chip and code in a system.

BRIEF SUMMARY

According to an embodiment of the present invention, a computer-implemented method for creating a tamper-resistant field programmable gate array (FPGA), the computer-implemented method comprising: determining, by one or more processors, if an encryption key is stored in a physical unclonable function (PUF) of the FPGA; responsive to the encryption key not being stored in a PUF, writing, by the one or more processors, an encryption key in tamper resistant memory associated with a back end of the line (BEOL) of the FPGA; writing, by the one or more processors, a program key in the tamper resistant memory; and writing, by the one or more processors, a look-up table (LUT) in the tamper resistant memory.

According to an embodiment of the present invention, a computer-implemented method for tamper resistant remote reprogramming of a field programmable gate array (FPGA), the computer-implemented method comprising: receiving, by one or more processors, a reprogramming request from a remote FPGA; generating, by the one or more processors, a random initialization vector; encrypting, by the one or more processors, a programming key and a bit file with an encryption key shared with the remote FPGA; and sending, by the one or more processors, the random initialization vector, the encrypted programming key and the encrypted bit file to the FPGA.

According to an embodiment of the present invention, a computer system for creating a tamper-resistant field programmable gate array (FPGA), the computer system comprising: one or more computer processors; one or more computer readable storage media; and program instructions stored on the one or more computer readable storage media for execution by at least one of the one or more processors, the program instructions comprising: program instructions to determine if an encryption key is stored in a physical unclonable function (PUF) of the FPGA; responsive to the encryption key not being stored in a PUF, program instructions to write an encryption key in tamper resistant memory associated with a back end of the line (BEOL) of the FPGA; program instructions to write a program key in the tamper resistant memory; and program instructions to write a look-up table (LUT) in the tamper resistant memory.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of trusted Field Programmable Gate Array (FPGA) manufacturing and reprogramming. It should be noted that the term software, as used herein, includes any type of computer instructions such as, but not limited to, firmware, microcode, etc.

In one embodiment of the present invention, provided is a manufacturing configuration allowing programmable logic to be integrated into an FPGA in a two-step manufacturing process. In a first step, a "non-trusted" foundry can provide front end of line (FEOL) manufacturing and application of the first metal layers. In a second step, a "trusted" foundry can provide back end of line (BEOL) manufacturing and memory configuration. It should be noted that "trusted" versus "non-trusted" is regarding a particular manufacturer and their access to logic associated with the purpose of the FPGA. For example, access to the physical unclonable function (PUF), the look-up table (LUT) data and/or a bit file of logic would be reserved for a "trusted" foundry.

In one embodiment the BEOL memory can be designed to be tamper resistant to attacks such as, but not limited to, side channel attacks, picosecond imaging circuit analysis (PICA) attacks, delayering attacks and measurement attacks. In another embodiment the BEOL memory can be used to design a PUF.

Advantages of the embodiments disclosed herein include space savings based on the memory being stacked above the logic, instead of the memory being integrated into the FEOL; no requirement for external flash memory; energy savings based on no bit file to load once the LUTs are loaded, so energy saving; better performance based on the FPGA "instant on" capability, i.e., no time required to load a bit file.

In one general embodiment, a computer-implemented method for creating a tamper-resistant field programmable gate array (FPGA). In one example, the computer-implemented method can write an encryption key in tamper-resistant memory at the end of a trusted manufacturing process. The encryption key can also be stored in a trusted database in the cloud. In another example, the computer-implemented method can read an encryption key from a physical unclonable function (PUF), randomly generated based on manufacturing variations in the tamper-resistant memory, at the conclusion of the trusted manufacturing process and store the encryption key in a trusted database in the cloud.

In another general embodiment, a computer-implemented method for tamper resistant remote reprogramming of a field programmable gate array (FPGA). The computer-implemented method can receive a reprogramming request for a remote FPGA. For example, a request can be generated by an application in a cloud environment responsible for software updates. Generating a random initialization vector and encrypting, by the one or more processors, a programming key and a bit file with an encryption key shared with the remote FPGA. Sending, by the one or more processors, the random initialization vector, the encrypted programming key and the encrypted bit file to the FPGA.

In another general embodiment, a computer program product for creating a tamper-resistant field programmable gate array (FPGA) includes a computer-readable storage medium having program instructions embodied therewith. The program instructions are executable by a computer to cause the computer to perform the foregoing computer-implemented method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
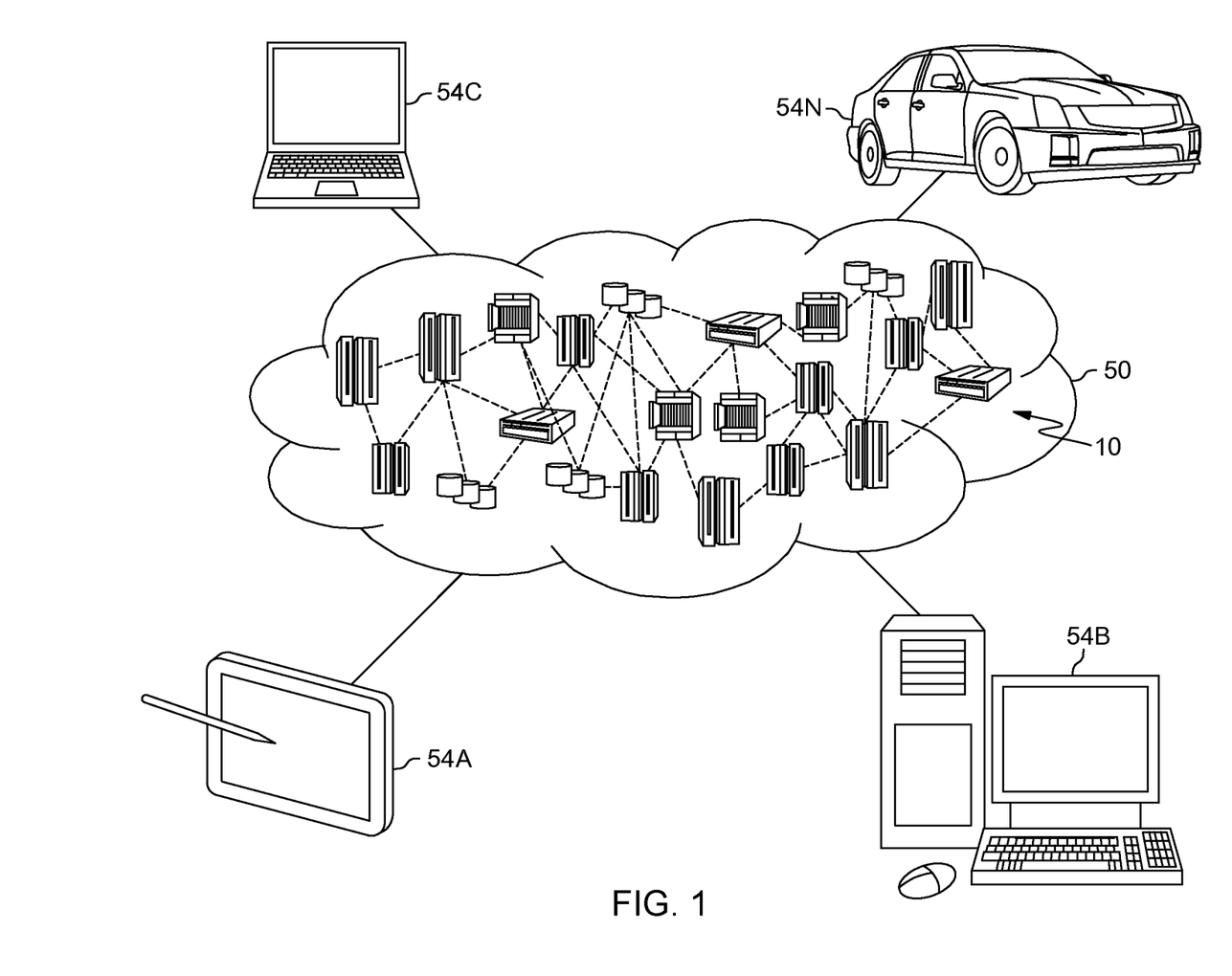
FIG. 1 depicts a cloud computing environment, according to embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
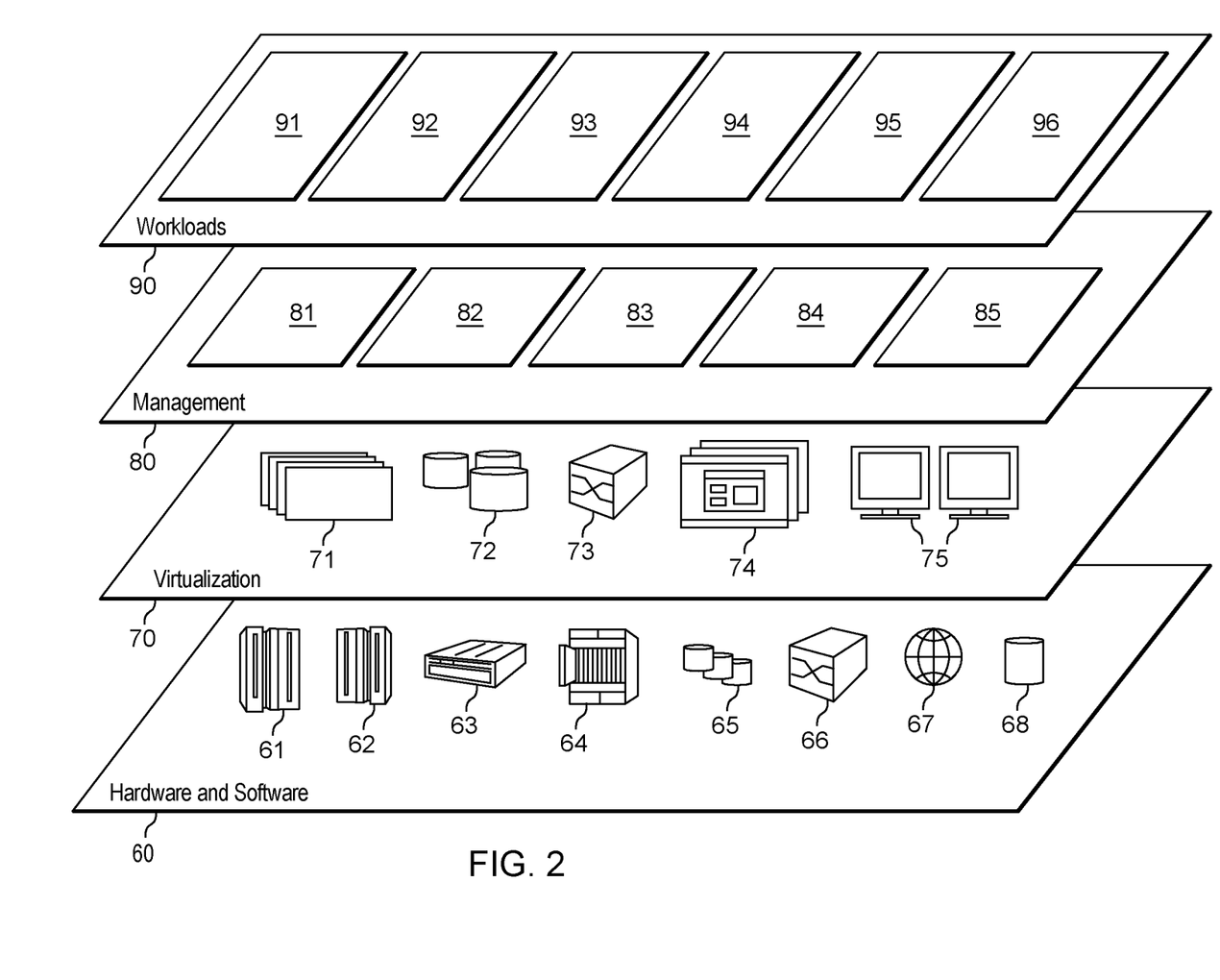
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and trusted FPGA reprogramming 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
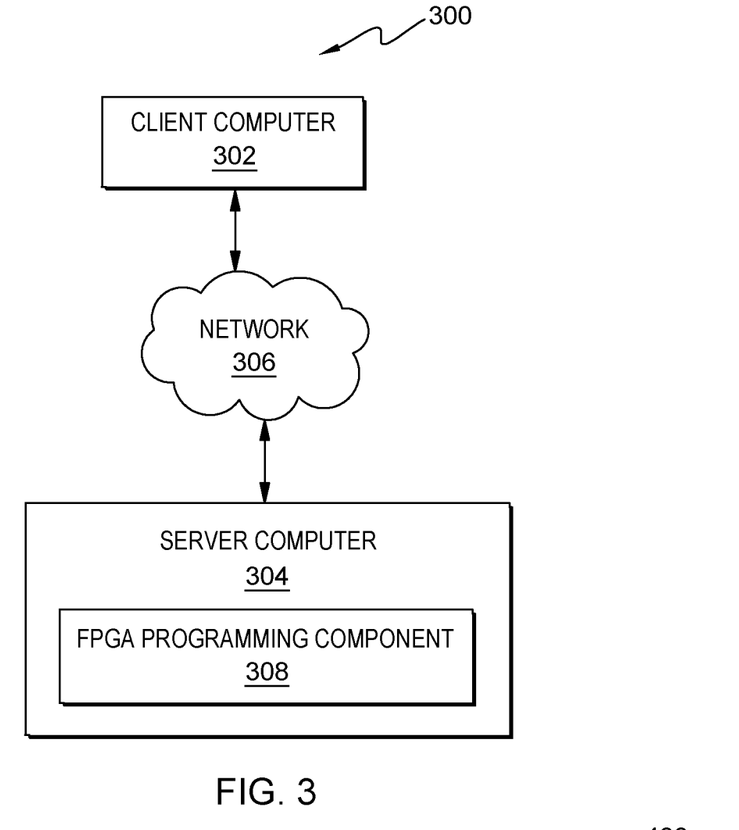
FIG. 3 is a high-level architecture, according to embodiments of the present invention.
Figure 4:
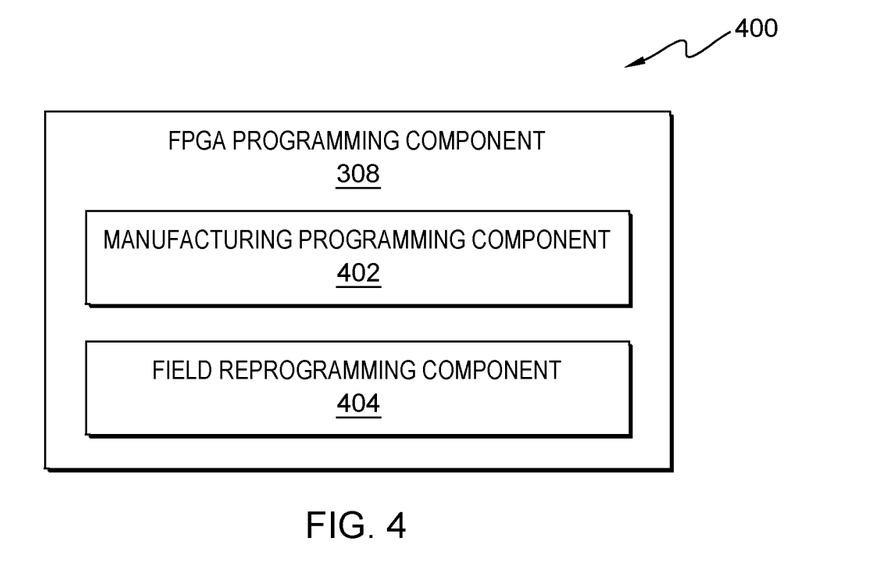
FIG. 4 is an exemplary detailed architecture, according to embodiments of the present invention.
Figure 5:
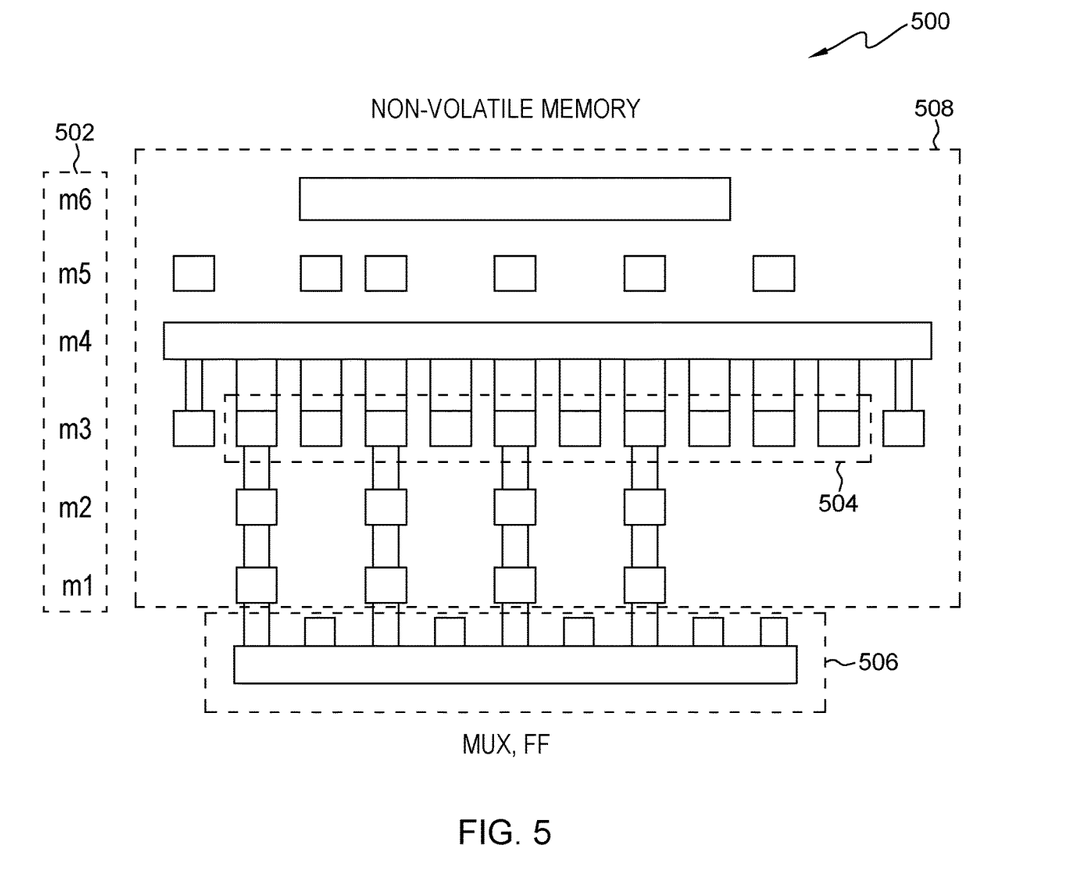
FIG. 5 is an exemplary detailed architecture, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram showing an exemplary processing system for a manufacturing environment for programming an FPGA device or an environment for field reprogramming of an FPGA device to which the invention principles may be applied. The architecture 300 comprises a client computer 302, an FPGA programming component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one aspect, FPGA programming component 308, operational on server computer 304, can program an FPGA based on a bifurcated manufacturing process. FPGA programming component 308 can incorporate a non-trusted manufacturing process and a trusted manufacturing process. In the non-trusted manufacturing process, FPGA programming component 308 can allow the front end of line (FEOL) and first metal layer portions of the FPGA to be manufactured by a non-trusted manufacturer. The non-trusted portion of the manufacturing does not expose any security keys or bit files to any non-trusted personnel. It should be noted that bit files can be data associated with look-up tables (LUTs) and their implemented logic.

In another aspect, FPGA programming component 308, operational on server computer 304, can reprogram an FPGA in the field when necessary, e.g., when updated logic is available for the FPGA. FPGA programming component 308 can reprogram an FPGA based on an untrusted channel and one out of two devices using symmetrical encryption.

In one non-limiting example, an FPGA can be used in a cloud center as a programmable hardware accelerator for artificial intelligence (AI) or other tasks in a cloud-based environment. FPGA programming component 308 (can be a dedicated server) can have access to a secured database with encryption keys and can reprogram one or more FPGAs securely by encrypting and uploading new bit files. It should be noted that a single or a plurality of encryption keys can be used to encrypt the bit files and distribute them over a network to FPGA workers, i.e., a processor and FPGA combination boards that are part of the cloud.

It should be noted that two types of encryption keys can be employed. In one case, an encryption key can be written, after trusted manufacturing has been completed, and then saved in a trusted database. The advantage of this approach is that the same encryption key can be used by multiple FPGAs, which simplifies the encryption key management, the encryption and distribution of the bit files and accordingly, reduces cost. The disadvantage is that if the encryption key is breached then all the FPGAs sharing the same encryption key are compromised.

In another case, the encryption key can be generated by a PUF function. In this case, the encryption key is randomly generated once, based on manufacturing variability, for each FPGA. Accordingly, FPGAs have different encryption keys, at least a very high probability of no two encryption keys being identical. The advantage is that there is no need to write a key to the FPGA. The disadvantage is that many encryption keys must be managed.

In another non-limiting example, an FPGA can be used as a programmable hardware accelerator for AI or other tasks in a micro cloud center environment. A micro cloud allows the deployment of low-latency local services, e.g., for fifth generation (5G) cellular communication service. Accordingly, FPGA programming component 308 can manage an FPGA bit file update through a network with the use of encryption keys stored in a secured database in the cloud. The secured database and bit file repository can be managed by a private cloud. The bit files can be deployed by the private cloud on a public cloud where the FPGA accelerators are deployed based on a hybrid cloud architecture.

In another non-limiting embodiment, an FPGA can be used as a programmable hardware accelerator for AI or other tasks in an internet of things (IoT) environment. The IoT device can be a machine, a transportation device or any device using local computing. IoT devices using embodiments described herein can be programmed (or reprogrammed) securely by the FPGA programming component 308 in a cloud environment based on using encryption keys stored in a secured database in the cloud. It should be noted that the environment can also be an edge computing environment.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise an FPGA programming component 308, which can further comprise a manufacturing programming component 402 and a field reprogramming component 404.

The manufacturing programming component 402 can program an FPGA that has been partially manufactured by a non-trusted manufacturer and partially manufactured by a trusted manufacturer.

A non-trusted manufacturer can provide manufacturing programming component 402 a partially manufactured FPGA, e.g., the FEOL and the lower-level metal layers. A trusted manufacturer can operate on the partially manufactured FPGA, adding the remaining back end of line (BEOL) and upper-level metal layers, including resistive random-access memory (RRAM) and any non-volatile memory integrated into the BEOL such as, but not limited to, magnetoresistive random access memory (MRAM), spin-transfer (ST) MRAM and spin-transfer torque (STT) MRAM.

Manufacturing programming component 402 can incorporate an encryption key into a physical unclonable function (PUF) or write the encryption key in tamper resistant memory, e.g., RRAM in a selected location in the metal layers of the BEOL. Manufacturing programming component 402 can write a program key in the tamper resistant memory, e.g., RRAM as specified above, and write an associated LUT in the tamper resistant memory. It should be noted that manufacturing programming component 402 can use LUTs and RRAM to implement any Boolean function.

For example, three inputs and one output can be synthesized with eight bits of RRAM and seven 2:1 multiplexors. In this example, the 2:1 multiplexors can be manufactured by the non-trusted manufacturer in the FEOL and lower-level metal and the eight bits of tamper resistant RRAM memory for the LUT can be manufactured by the trusted manufacturer in the upper level metal.

Field reprogramming component 404 can prevent attacks such as, but not limited to, "man in the middle," chip misrepresentation and cloud misrepresentation. Field reprogramming component 404 can secure an FPGA reprogramming if the communication link is not secure, if the chip is untrusted or if a server is untrusted. Field reprogramming component 404 can prevent the compromise of the PUF, the program key and the encryption key, even if the communication link is untrusted and the chip or the server is untrusted.

Field reprogramming component 404 can use an untrusted channel and one of two devices, i.e., the chip or the server, as untrusted and can securely program the FPGA using symmetrical encryption. Field reprogramming component 404 can randomly generated initialization vectors before each transmission so a bit file becomes different after each encryption. It should be noted that an encrypted programing key and a bit file cannot be used if intercepted by a man-in-the-middle. Further, a rogue FPGA cannot use the bit file if it does not have access to the encryption key and the programing key and a rogue cloud system cannot program the FPGA if it does not have access to the encryption key and the programing keys.

Field reprogramming component 404 can send a request to an FPGA for reprogramming. Included in the request can be an initialization vector an encrypted programming key and an encrypted bit file. It should be noted that the encryption is accomplished with an encryption key that is known to field reprogramming component 404 and the encryption key stored in the tamper resistant memory described above. The FPGA uses the encryption key from the tamper resistant memory to decrypt the programming key and compares the decrypted programming key to the programming key stored in the tamper resistant memory. If the two programming keys match, then the FPGA decrypts the bit file and loads it into the LUT portion of the tamper resistant memory. If the two programming keys do not match, then the FPGA does nothing or executes some random function. It should be noted that under some circumstances, e.g., an FPGA is deployed before initial programming, an FPGA can request either an update or access to a bit file. Further, If the FPGA programing request is initiated by the FPGA the initialization vector is generated by the FPGA, requiring integration of a random generator circuit or function on the FPGA to generate the initialization vector that must be a different number each time it is activated.

FIG. 5 is an example of an FPGA 500 comprising FEOL 506, BEOL 508 with metal layers 502 "m1-m6" and RRAM 504. It should be noted that the RRAM 504 can be the storage location for a LUT. It should further be noted that the FEOL 506 can include multiplexors and flip-flops.

In one aspect, programmable logic can be integrated into both the BEOL 508 and FEOL 506. The RRAM 504 can be designed to be tamper resistant to side channel attack, Picosecond Imaging Circuit Analysis (PICA), delayering and measurements. Further, the RRAM 504 can be used to design a PUF. It should be noted that the FEOL 506 can be manufactured in non-trusted foundry and the BEOL 508 can be manufactured in a trusted foundry. Another advantage of the embodiments described herein is a space savings based on stacking the RRAM 504 above the logic. Embodiments of the present invention do not require external flash memory, based on the use of RRAM 504. In some embodiments, bit files are not necessary after the LUT is loaded, i.e., energy savings, and the FPGA has "instant on" capability because loading a bit file is not necessary.

Figure 6A:
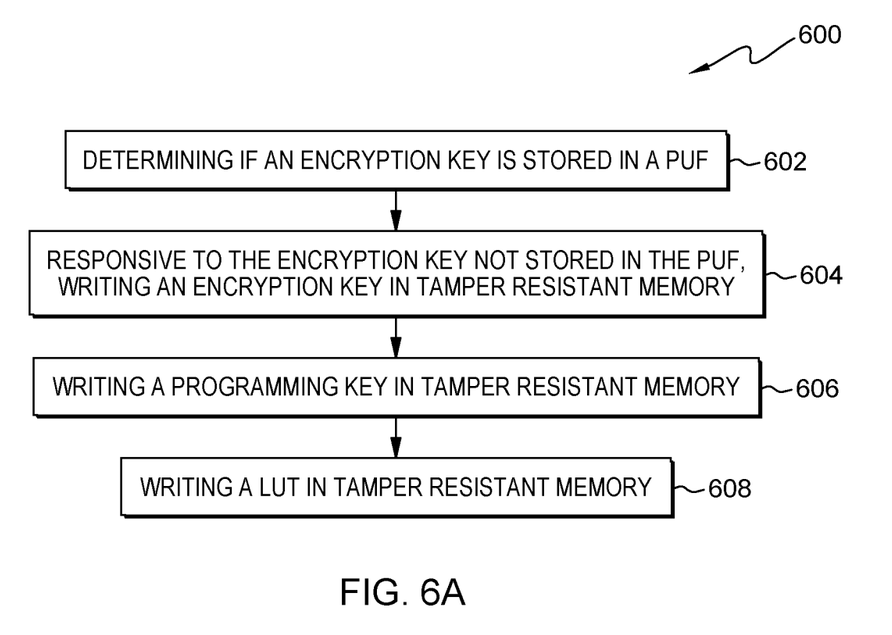
FIG. 6A is a flowchart of a method, according to embodiments of the present invention.

FIG. 6A is an exemplary flowchart of a method 600 for creating a tamper resistant FPGA. At step 602, an embodiment can determine, via manufacturing programming component 402, if an encryption key is stored in a PUF. At step 604, if the encryption key is not stored in the PUF, then the embodiment can write, via manufacturing programming component 402, an encryption key in tamper resistant memory associated with a BEOL of the FPGA. At step 606, the embodiment can write, via manufacturing programming component 402, a programming key in the tamper resistant memory. At step 608, the embodiment can write, via manufacturing programming component 402, a LUT in the tamper resistant memory.

Figure 6B:
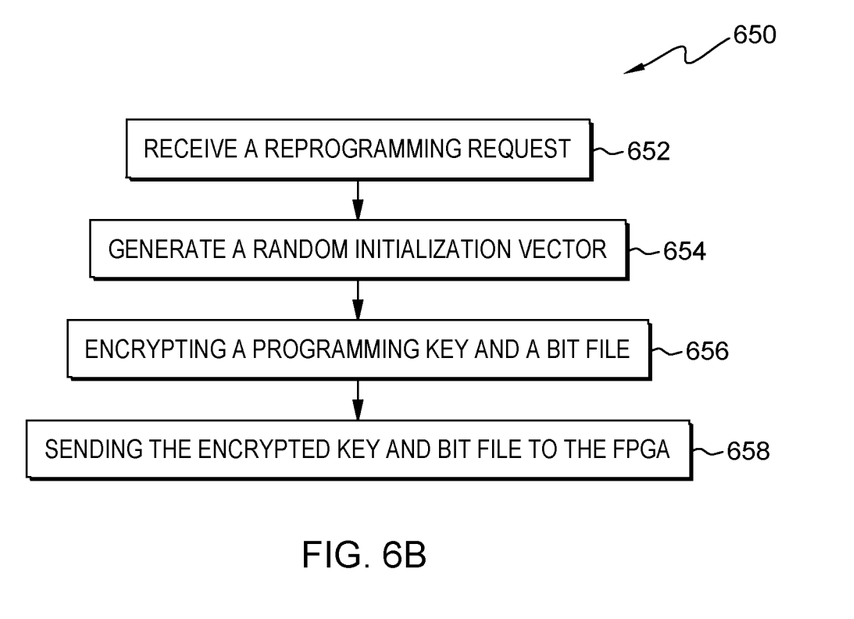
FIG. 6B is a flowchart of a method, according to embodiments of the present invention.

FIG. 6B is an exemplary flowchart of a method 650 for tamper resistant remote programming of an FPGA. At step 652, an embodiment can receive, via field reprogramming component 404, a reprogramming request from a remote FPGA. At step 654, the embodiment can generate, via field reprogramming component 404, a random initialization vector. At step 656, the embodiment can encrypt, via field reprogramming component 404, a programming key and a bit file with a shared encryption key, i.e., symmetrical encryption. At step 658, the embodiment can send, via field reprogramming component 404, the encrypted programming key and bit file to the FPGA.

Figure 7:
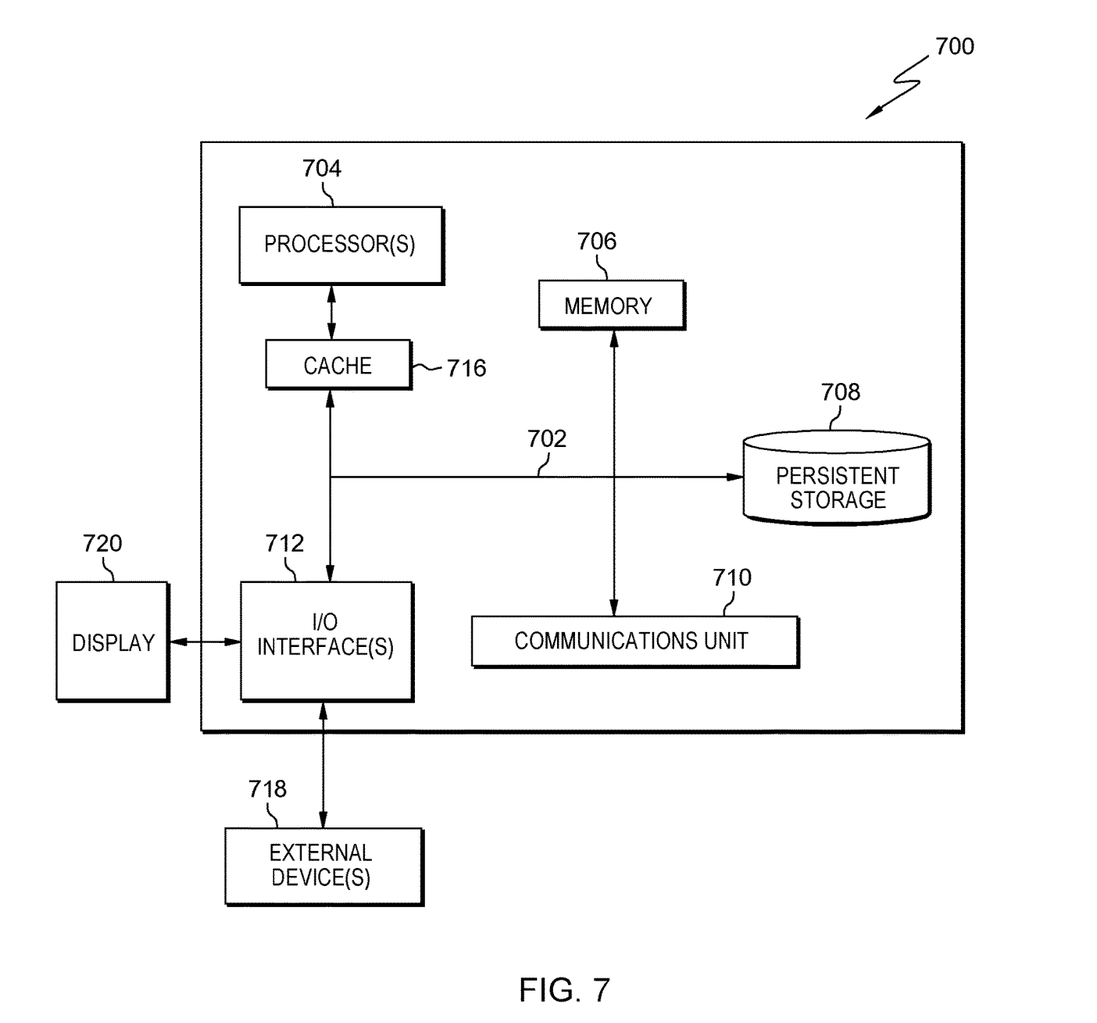
FIG. 7 is a block diagram of internal and external components of a data processing system in which embodiments described herein may be implemented, according to embodiments of the present invention.

FIG. 7 depicts computer system 700, an example computer system representative of client computer 302 and server computer 304. Computer system 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Computer system 700 includes processors 704, cache 716, memory 706, persistent storage 708, communications unit 710, input/output (I/O) interface(s) 712 and communications fabric 702. Communications fabric 702 provides communications between cache 716, memory 706, persistent storage

708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of processors 704 by holding recently accessed data, and data near recently accessed data, from memory 706.

Program instructions and data used to practice embodiments of the present invention may be stored in persistent storage 708 and in memory 706 for execution by one or more of the respective processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Program instructions and data used to practice embodiments of the present invention may be downloaded to persistent storage 708 through communications unit 710.

I/O interface(s) 712 allows for input and output of data with other devices that may be connected to each computer system. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention can be stored on such portable computer readable storage media and can be loaded onto persistent storage 708 via I/O interface(s) 712. I/O interface(s) 712 also connect to display 720.

Display 720 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating a tamper-resistant field programmable gate array (FPGA), the computer-implemented method comprising:
   determining, by one or more processors, if an encryption key is stored in a physical unclonable function (PUF) of the FPGA;
   responsive to the encryption key not being stored in a PUF, writing, by the one or more processors, an encryption key in tamper resistant memory associated with a back end of the line (BEOL) of the FPGA;
   writing, by the one or more processors, a program key in the tamper resistant memory; and
   writing, by the one or more processors, a look-up table (LUT) in the tamper resistant memory.

2. The computer-implemented method of claim 1, wherein the tamper resistant memory is at least one of resistive random-access memory (RRAM), spin-transfer (ST) RRAM or spin-transfer torque (STT) RRAM.

3. The computer-implemented method of claim 1, wherein a first portion of the FPGA is manufactured in a non-trusted foundry and a remaining portion is manufactured in a trusted foundry.

4. The computer-implemented method of claim 3, wherein the first portion is a front end of the line (FEOL) of the FPGA and the remaining portion is the BEOL of the FPGA.

5. The computer-implemented method of claim 4, wherein the FPGA further comprises one or more multiplexors in the FEOL for use by the LUT.

6. The computer-implemented method of claim 4, wherein the FPGA further comprises one or more flip-flops in the FEOL for use by the LUT.

7. The computer-implemented method of claim 2, wherein the PUF is implemented in the tamper resistant memory.

8. The computer-implemented method of claim 1, wherein the encryption key is stored in a trusted database in a private cloud and written to the FPGA in a trusted facility.

9. A computer-implemented method for tamper resistant remote reprogramming of a field programmable gate array (FPGA), the computer-implemented method comprising:
   receiving, by one or more processors, a reprogramming request from a remote FPGA;
   generating, by the one or more processors, a random initialization vector;
   encrypting, by the one or more processors, a programming key and a bit file with an encryption key shared with the remote FPGA; and
   sending, by the one or more processors, the random initialization vector, the encrypted programming key and the encrypted bit file to the FPGA.

10. The computer-implemented method of claim 9, wherein the encryption is symmetrical encryption.

11. The computer-implemented method of claim 9, wherein the bit file comprises Boolean logic for a LUT.

12. The computer-implemented method of claim 9, wherein the encryption key is stored in tamper resistant memory associated with a back end of the line (BEOL) on the FPGA.

13. The computer-implemented method of claim 12, wherein the tamper resistant memory is at least one of resistive random-access memory (RRAM), spin-transfer (ST) RRAM or spin-transfer torque (STT) RRAM.

14. The computer-implemented method of claim 12, further comprising:
   receiving, by the one or more processors, an acknowledgment indicating a match between the decrypted encrypted programming key and a local programming key stored in the tamper resistant memory.

15. The computer-implemented method of claim 14, wherein the encrypted programming key is decrypted with the encryption key stored in the tamper resistant memory.

16. A computer system for creating a tamper-resistant field programmable gate array (FPGA), the computer system comprising:
   one or more computer processors;
   one or more computer readable storage media; and
   program instructions stored on the one or more computer readable storage media for execution by at least one of the one or more processors, the program instructions comprising:
      program instructions to determine if an encryption key is stored in a physical unclonable function (PUF) of the FPGA;
      responsive to the encryption key not being stored in a PUF, program instructions to write an encryption key in tamper resistant memory associated with a back end of the line (BEOL) of the FPGA;
      program instructions to write a program key in the tamper resistant memory; and
      program instructions to write a look-up table (LUT) in the tamper resistant memory.

17. The computer-implemented method of claim 16, wherein the tamper resistant memory is at least one of resistive random-access memory (RRAM), spin-transfer (ST) RRAM or spin-transfer torque (STT) RRAM.

18. The computer-implemented method of claim 16, wherein a front end of the line (FEOL) of the FPGA is manufactured in a non-trusted foundry and the BEOL is manufactured in a trusted foundry.

19. The computer-implemented method of claim 18, wherein the FPGA further comprises one or more multiplexors in the FEOL for use by the LUT and one or more flip-flops in the FEOL for use by the LUT.

20. The computer-implemented method of claim 16, wherein the PUF is implemented in the tamper resistant memory.

\* \* \* \* \*